United States Patent [19]

Davis

[11] Patent Number: 4,583,596

[45] Date of Patent: Apr. 22, 1986

[54] DUAL METAL SEAL FOR A WELL SAFETY VALVE

[75] Inventor: Jonathan P. Davis, Houston, Tex.

[73] Assignee: Camco, Incorporated, Houston, Tex.

[21] Appl. No.: 776,066

[22] Filed: Sep. 13, 1985

[51] Int. Cl.[4] ............................................. E21B 34/12
[52] U.S. Cl. .................................. 166/332; 166/334; 137/516.29; 251/357
[58] Field of Search ............. 166/319, 323, 332, 334; 277/205, 206 R; 251/332, 357, 359, 368; 137/516.27, 516.29

[56] References Cited

U.S. PATENT DOCUMENTS

| | | | |
|---|---|---|---|
| 3,489,170 | 1/1970 | Leman | 137/516.29 |
| 4,161,219 | 7/1979 | Pringle | 166/324 |
| 4,427,071 | 1/1984 | Carmody | 166/332 |
| 4,457,376 | 7/1984 | Carmody et al. | 166/332 |
| 4,476,933 | 10/1984 | Brooks | 166/319 |
| 4,513,946 | 4/1985 | Priese | 251/173 |

Primary Examiner—James A. Leppink
Assistant Examiner—Terry Melius
Attorney, Agent, or Firm—Fulbright & Jaworski

[57] ABSTRACT

A seat coacting with the flapper of a subsurface well safety valve which includes a solid metal annular seat and an annular flexible metal seal in a recess about the solid seat. The flexible seal has a base secured in the recess and a resilient sealing lip which is generally V-shaped in cross section with one end of one of the legs of the V being connected to the base and sealing against the side of the recess and the other leg extending downwardly beyond the solid seat for making contact with the flapper before the flapper seats on the solid seat. The solid seat and the sealing lip are directed downwardly at an angle with the angle of the sealing lip being greater than the angle of the solid seat.

6 Claims, 4 Drawing Figures

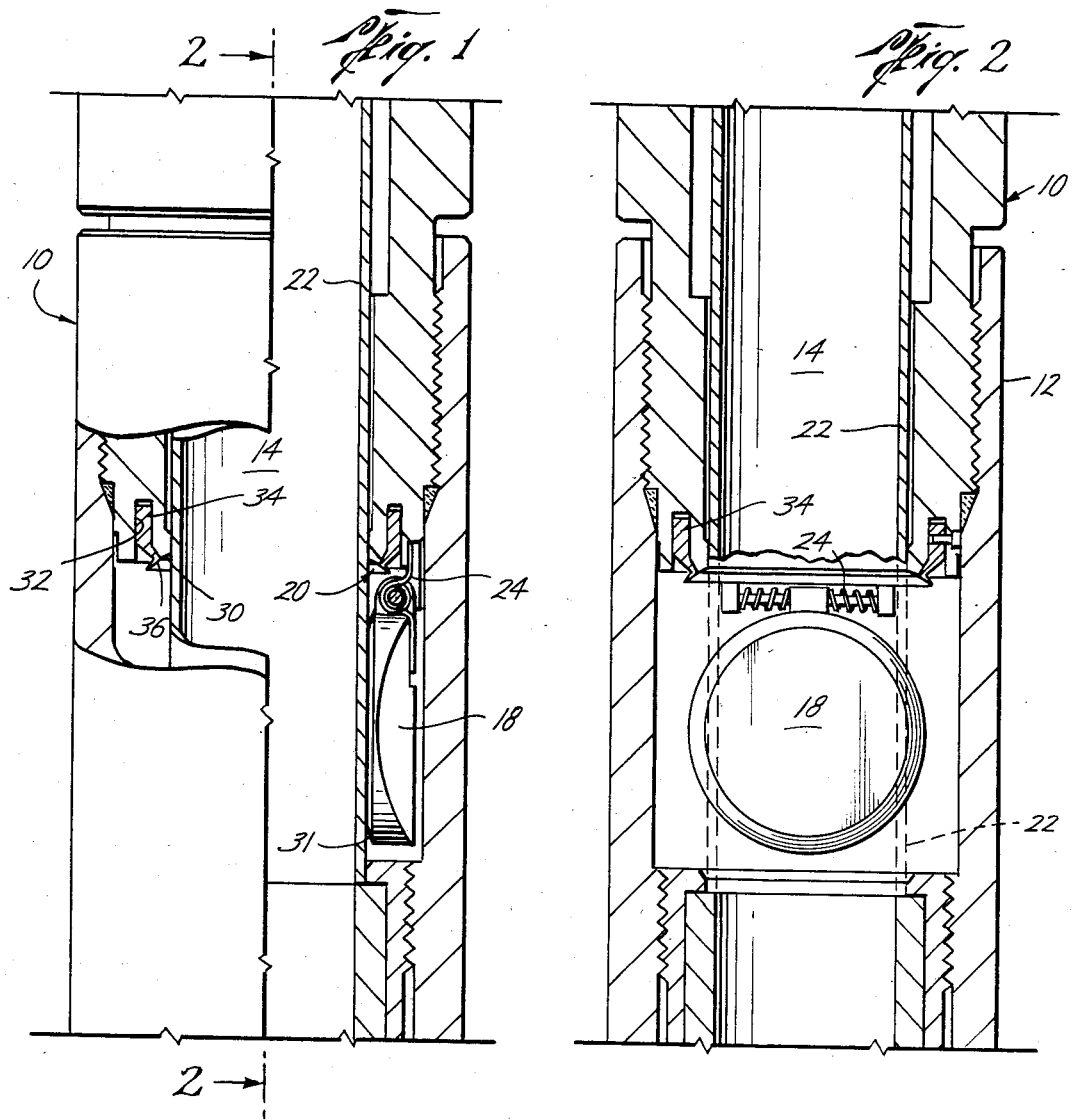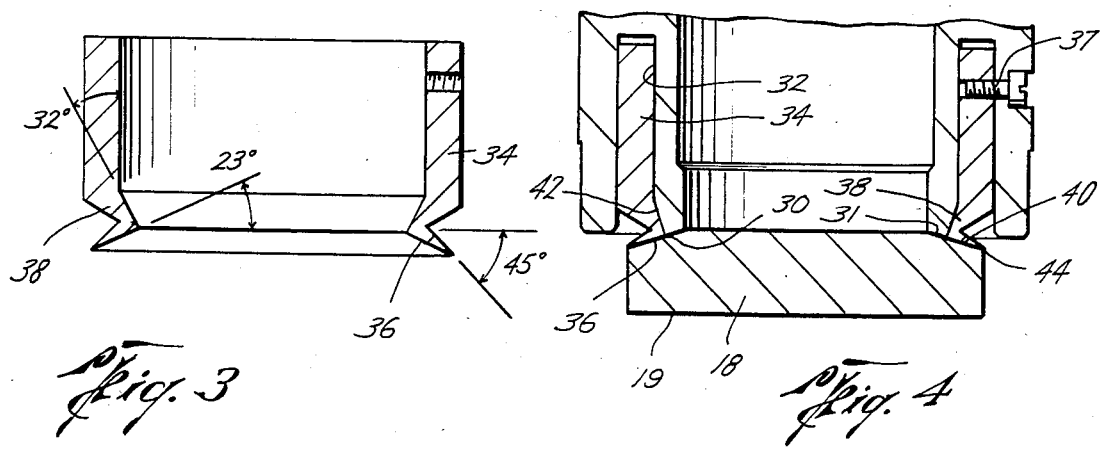

DUAL METAL SEAL FOR A WELL SAFETY VALVE

BACKGROUND OF THE INVENTION

It is well known to use a flapper type subsurface well safety valve, as shown in U.S. Pat. No. 4,161,219, in which the flapper seats on a metal seat and an elastomer seal for controlling the flow of well fluids from producing oil and/or gas wells. However, the safety valve must be able to withstand hostile environments in which high temperatures and pressures are encountered and the well fluids frequently contain corrosive fluids and abrasive particles such as sand. Since the safety valves may be required to remain in service for many years and still be able to close and shut off high pressures, it is important that the flapper valve and its coacting seat be able to maintain their integrity. However, it is well known that elastomer seals frequently fail under such conditions. Flexible metal seals, such as shown in U.S. Pat. No. 4,513,946, which have been proposed in other valves, would not be satisfactory for use in a subsurface well safety valve.

The present invention is directed to an improved seat in a flapper type well safety valve having a solid metal annular seat capable of withstanding extremely high pressures and supporting a flexible second annular metal seal which initially makes contact with the flapper before the flapper contacts the solid seat on closing for providing a redundant long lasting seal which can withstand the harsh environmental conditions in a high temperature, high pressure oil and/or gas producing well.

SUMMARY

The present invention is directed to a subsurface well safety valve for controlling the fluid flow through a well conduit in which the valve includes a housing having a bore and a pivoting metal flapper valve in the bore moving between open and closed positions. The improvement in a seat coacting with the flapper valve includes a solid metal annular seat directed downwardly about the bore for coacting with the flapper. The housing includes an annular recess outside of the solid metal seat and the recess includes a downwardly directed opening adjacent the solid seat. A flexible annular metal seal is provided in the recess and the flexible metal seal has a base secured in the recess and includes a resilient sealing lip connected to the base. The end of the lip initially extends out of the opening and downwardly beyond the solid seat for initially making contact with the flapper before the flapper contacts the solid seat upon closing.

Still a further object of the present invention is wherein the solid seat and the sealing lip are directed downwardly at an angle and the downwardly directed angle of the sealing lip is greater than the downwardly directed angle of the solid seat.

Still a further object of the present invention is wherein the resilient sealing lip is generally V-shaped in cross section with the free end of one of the legs of the V being connected to the base whereby the leg connected to the base seals against the side of the recess when the flapper is closed.

A still further object of the present invention is the provision of an annular wall between the solid seat and the recess which is directed downwardly and inwardly towards the solid seat for providing a surface against which the lip seals when compressed by the flapper.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is a fragmentary elevational view, partly in cross section, of a portion of a flapper type safety valve shown in the open position, FIG. 2 is a cross-sectional view taken along the line 2—2 of FIG. 1, FIG. 3 is an enlarged cross-sectional view of the seat of the present invention when the valve is in the open position, and FIG. 4 is a view similar to FIG. 3 showing the flapper in the closed position.

DESCRIPTION OF THE PREFERRED EMBODIMENT

Referring now to the drawings, and particularly to FIGS. 1 and 2, the reference numeral 10 generally indicates a subsurface flapper type safety valve having a housing 12 and a bore 14, a flapper valve 18 and a seat generally indicated by the reference numeral 20. When the flapper valve 18 is seated on the valve seat 20, the safety valve 10 is closed blocking flow upwardly through the bore 14 and any well tubing to which the valve 10 is connected.

The flapper 18 is moved downwardly to an open position by downward movement of a flow tube 22 and held in the downward position so long as the flow tube 22 is in the downward position. When the tube 22 is moved upwardly, the flapper 18 is allowed to move upwardly on to the seat by the action of a spring 24 and the action of fluid flow moving upwardly through the bore 14. The flow tube 22 is controlled by conventional means.

While the present invention may be used in various types of flapper actuated well safety valves, for a fuller description of the structure and operation of one suitable type of well safety valve, the disclosure of U.S. Pat. No. 4,161,219 is herewith incorporated by reference.

However, the prior art seats generally include a metal seat and an elastomer seal. However, because of the environmental conditions encountered, such as temperature, pressure, corrosive fluids, sand, and years of service, the seat, and particularly the resilient seat, are not able to stand up under such conditions and maintain the required sealing to tightly seal high pressures, for example, up to 20,000 psi.

The present invention is directed to providing a seat for coacting with the flapper valve 18 in which the seat is a dual metal seat comprising a solid metal annular seat and also a flexible annular metal seal. Thus, a solid metal annular seat 30 is provided directed downwardly about the bore 14 for coacting with the flapper 18. The housing also includes an annular recess 32 positioned outside of the solid metal seat 30 and includes a downwardly directed opening adjacent the solid seat 30. A flexible metal seat or seal is positioned in the recess 32 and includes a base 34 and a resilient sealing lip 36 connected to the base 34. The base 34 may be secured in the recess 32 by any suitable means such as a plurality of bolts 37. Initially, when the flapper 18 is in the open position, the lower end of the flexible lip 36 extends out of the opening and downwardly beyond the solid seat 30 for making contact with the flapper 18 before the flapper contacts the solid seat 30 upon closing.

As best seen in FIG. 3, with the flapper in the open position, the solid seat and the sealing lip are both directed downwardly at an angle and the downwardly directed angle of the sealing lip is greater than the downwardly directed angle of the solid seat. For example only, the annular solid seat 30 is directed downwardly at an angle of approximately 15 degrees to a plane transverse to the longitudinal axis of the body 12, while the annular plane of the lower end of the sealing lip is directed downwardly at an angle of approximately 23 degrees. Thus, when the flapper 18 moves upwardly it will contact the flexible lip 36 first with a line contact before contacting the solid seat 30 and when well pressure is applied to the bottom side of the flapper 18 increasing the pressure of the flapper 18 against the seats 30 and 36, the flexible lip 36 will be deflected upwardly increasing the sealing force and sealing area of the flexible lip 36.

Preferably, the resilient sealing lip 30 is generally V-shaped in cross section having a first leg 38 and a second leg 40. The one end of the leg 38 is connected to the base 34. Also, an annular wall 42 is provided between the recess 32 and the solid seat 30 which is directed downwardly and towards the solid seat 30. Thus the leg 38, upon closure of the flapper 18, will seal against the wall 42.

The various sealing surfaces are preferably polished metal surfaces such as the solid seat 30, the coacting sealing surface 31 on the flapper 18, the wall 42, the sealing leg 38, and the lower end of the flexible lip 36. In addition, the sealing surfaces may be enhanced with a suitable soft coating such as gold to provide a softer, smoother and better sealing surface.

In operation, as the flow tube 22 moves upwardly, the flapper 18 will move to the closed position by the action of the spring 24 to close the bore 14 to upward movement of well fluid flowing through the safety valve 10. The flapper 18 would first contact the outer end 44 of the leg 40 of the lip seal 36 since it is positioned below the solid seat 30 and has an initial downwardly directed angle greater than the angle of the seat 30. Upon well pressure being applied to the lower side 19 of the flapper valve 18, the leg 40 is deflected upwardly increasing the sealing force between the leg 40 and the surface 31 of the flapper valve 18. In addition, the leg 38 of the lip seal 36 is forced inwardly against the wall 42 to provide a seal therebetween. Thereafter the flapper 18 seats on the solid seat 30 to prevent overstressing the flexible lip seal 36 as well as providing support for the interior side of the first leg 38. Thus, the redundant metal-to-metal seals 30 and 36 provide a high temperature, high pressure seal which can overcome the environmental conditions encountered to provide a long service life.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. In a subsurface well safety valve for controlling the fluid flow through a well conduit including a housing having a bore and a pivoting metal flapper valve in the bore moving between open and closed positions, the improvement in a seat coacting with the flapper valve comprising, a solid metal annular seat directed downwardly about the bore for coacting with the flapper, said housing including an annular recess outside of the solid metal seat, said recess including a downwardly directed opening adjacent the solid seat, a flexible metal seal in the recess, said flexible seal having a base secured in the recess and including a resilient sealing lip connected to the base with the end of the lip initially extending out of said opening and downwardly beyond the solid seat for making contact with the flapper before the flapper contacts the solid seat upon closing.

2. The apparatus of claim 1 wherein the solid seat and the sealing lip are directed downwardly at an angle and the downwardly directed angle of the sealing lip is greater than downwardly directed angle of the solid seat.

3. The apparatus of claim 1 wherein the resilient sealing lip is generally V-shaped in cross section with one end of one of the legs of the V being connected to the base whereby the leg connected to the base seals against the side of the recess when the flapper is closed.

4. The apparatus of claim 1 including an annular wall between the solid seat and the recess which is directed downwardly and inwardly towards the solid seat for providing a surface against which the lip seals when compressed by the flapper.

5. In a subsurface well safety valve for controlling the fluid flow through a well conduit including a housing having a bore and a pivoting metal flapper valve in the bore moving between open and closed positions, the improvement in a seat coacting with the flapper valve comprising, a solid metal annular seat directed downwardly about the bore for coacting with the flapper, said housing including an annular recess outside of the solid metal seat, said recess including a downwardly directed opening adjacent the metal solid seat, a flexible metal seal in the recess, said flexible seal having a base secured in the recess and a resilient sealing lip which is generally V-shaped in cross section with one end of one of the legs of the V being connected to the base and the other leg initially extending out of said opening and downwardly beyond the solid seat for making contact with the flapper before the flapper contacts the solid seat upon closing, said solid seat and the sealing lip are directed downwardly at an angle and the downwardly directed angle of the sealing lip is greater than the downwardly directed angle of the solid seat.

6. The apparatus of claim 5 including an annular wall between the solid seat and the recess which is directed downwardly and inwardly towards the solid seat for providing a surface against which the one leg of the lip seals when compressed by the flapper.

* * * * *